(12) United States Patent
Lewalski-Brechter

(10) Patent No.: US 7,240,235 B2
(45) Date of Patent: Jul. 3, 2007

(54) JOURNALING TECHNIQUE FOR WRITE TRANSACTIONS TO MASS STORAGE

(75) Inventor: Norbert Lewalski-Brechter, Neudenau (DE)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 10/097,166

(22) Filed: Mar. 13, 2002

(65) Prior Publication Data
US 2003/0177308 A1 Sep. 18, 2003

(51) Int. Cl.
*G06F 12/16* (2006.01)
*G06F 11/08* (2006.01)

(52) U.S. Cl. .................. 714/6; 714/52; 714/5; 714/54; 714/2; 711/162; 711/161; 711/114; 711/112; 709/214; 709/217; 709/218; 709/219

(58) Field of Classification Search ................ 711/114, 711/156, 112, 4, 5, 111, 113, 148, 162; 714/5, 714/6, 7, 4, 8; 709/214, 217, 218, 219, 201, 709/203, 213
See application file for complete search history.

(56) References Cited

U.S. PATENT DOCUMENTS

| | | | | |
|---|---|---|---|---|
| 5,559,778 A | * | 9/1996 | Inokuchi et al. | 369/53.24 |
| 5,893,164 A | * | 4/1999 | Legg | 711/156 |
| 6,078,979 A | * | 6/2000 | Li et al. | 710/312 |
| 6,324,654 B1 | * | 11/2001 | Wahl et al. | 714/6 |
| 6,553,511 B1 | * | 4/2003 | DeKoning et al. | 714/6 |

FOREIGN PATENT DOCUMENTS

| | | | |
|---|---|---|---|
| EP | 0452991 A2 | * | 10/1991 |
| JP | 08263227 A | * | 10/1996 |
| JP | 09026857 A | * | 1/1997 |

\* cited by examiner

*Primary Examiner*—B. James Peikari
(74) *Attorney, Agent, or Firm*—Trop, Pruner & Hu, P.C.

(57) ABSTRACT

A technique includes writing blocks of data from a plurality of servers to an array of disks that are shared in common by the servers. Prior to the writing in each block of data to the array of disks, the method includes storing in a journal a copy of the block of data to be written to the array of disks. Also stored in the journal is at least one header, and this header(s) indicates that the copy was successfully stored in the journal.

17 Claims, 7 Drawing Sheets

JOURNALING TECHNIQUE FOR WRITE TRANSACTIONS TO MASS STORAGE

BACKGROUND

The invention generally relates to a journaling method for write transactions to mass storage, such as an array of disk drives, for example.

A redundant array of inexpensive disks (RAID) (called a "RAID array") is often selected as the mass storage for a computer system due to the array's ability to preserve data even if one of the disk drives of the array should fail. As an example, in an arrangement called RAID4, data may be stored across three disk drives of the array, with a dedicated drive of the array serving as a parity drive. Due to the inherent redundancy that is presented by this storage technique, the data from any three of the drives may be used to rebuild the data on the remaining drive. In an arrangement known as RAID5, the parity information is not stored on a dedicated disk drive, but rather, the parity information is stored across all drives of the array. Other RAID techniques are commonly used.

The RAID array may be part of a cluster environment, an environment in which two or more file servers share the RAID array. For purposes of ensuring data consistency, only one of these file servers accesses the RAID array at a time. In this manner, when granted the exclusive access to the RAID array, a particular file server may perform the read and write operations necessary to access the RAID array. After the particular file server finishes its access, then another file server may be granted exclusive access to the RAID array. For purposes of establishing a logical-to-physical interface between the file servers and the RAID array, one or more RAID controllers typically are used. As examples of the various possible arrangements, a single RAID controller may be contained in an enclosure that houses the RAID array, or alternatively, each file server may have an internal RAID controller. In the latter case, each file server may have an internal RAID controller card that is plugged into a card connector slot of the file server.

For the case where the file server has an internal RAID controller, the file server is described herein as accessing the RAID array. However, it is understood that in these cases, it is actually the RAID controller card of the server that is accessing the RAID array. Using the term "server" in this context, before a particular server accesses the RAID array, the file server that currently is accessing the RAID array closes all open read and write transactions. Hence, under normal circumstances, whenever a file server is granted access to the RAID array, all data on the shared disk drives of the array are in a consistent state.

As noted above, the RAID array is designed to permit the recovery of the data on one of the disk drives of the array should a drive fail. However, a situation may occur in which a file server that owns the access right to the RAID array fails during its access to the array. For example, one of the servers, while accessing the RAID array, may fail due to a power failure. In response to this failure, the cluster management software (part of the server operating system) on one of the remaining servers of the cluster elects a suitable server to replace the failed server.

However, if the file server fails during a critical point of the access, inconsistency between the user data and parity data that the server has stored in the array during the access may occur. For example, in order for the file server to write a block of user data that is passed to the file server to the RAID array, the server performs five steps: 1. the server reads the old corresponding block of data from the RAID; 2. the server reads the old block of parity data from the RAID array; 3. using the old parity and user data, the server calculates the block of new parity data; 4. the server writes new user data to the RAID array; and 5. the server writes the block of new parity data to the RAID array. Disruption of the file server while the server is writing the new user data or the new parity data may present potential problems later on, for example, when a member disk drive of the array fails and an attempt is made to rebuild user data on the failed drive from the parity information. Thus, the parity inconsistency in this scenario may eventually lead to data corruption.

Thus, there is a continuing need for an arrangement that addresses one or more of the problems that are stated above.

DETAILED DESCRIPTION

Figure 1:
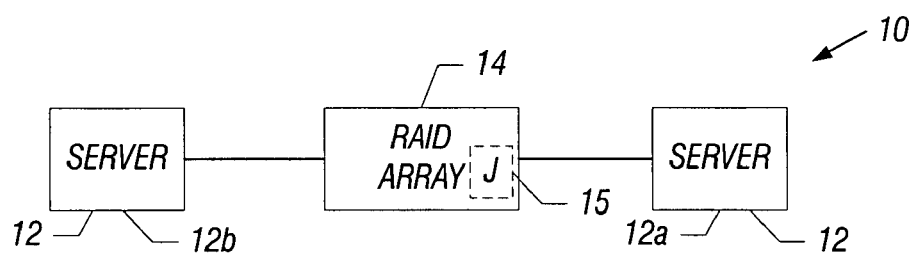
FIG. 1 is a schematic diagram of a computer system according to an embodiment of the invention.

Referring to FIG. 1, an embodiment 10 of the computer system in accordance with the invention includes file servers 12 (file servers 12a and 12b, depicted as examples) that are arranged in a cluster to share access to a Redundant Array of Inexpensive Disks (RAID) array 14. In this manner, each server 12 performs an access to the RAID array 14 to the exclusion of the other servers 12. In accordance with an embodiment of the invention, for purposes of preventing the failure of a particular server 12 from corrupting data on the RAID array 14, the servers 12 maintain a journal 15 of open transactions. In particular, before performing a particular write transaction to the RAID array 14, each server 12 records the data to be written in the write transaction in the journal on 15. Although two file servers 12a and 12b are depicted in FIG. 1, in some embodiments of the invention, the computer system 10 may include more than two file servers 12.

The journal 15 stores data for the most recent write transactions that have been performed or are to be performed to the RAID array 14. Due to the journal 15, should one of the servers 12 fail during its access to the array 14, the transactions that were supposed to be performed on the RAID array 14 during the access may be reconstructed by an elected substitute server 12 that has not failed. Thus, data consistency is preserved in the RAID array 14, even if one of the servers 12 fails during an access to the array 14.

In some embodiments of the invention, when a particular server 12 is to perform a write transaction to the RAID array 14, the server 12 first posts the data to be written to the RAID array 14 to the journal 15. Thus, the corresponding data in the journal 15 initially indicates an "open transaction" to be performed to the RAID array 14. Therefore, should the server 12 fail during its access to the RAID array 14, so that the server 12 does not complete one or more open transactions, another server 12 may perform the transactions that were supposed to be performed by the first server 12 during the access. It is noted that, as described below, when performing the transactions posted to the journal 14, some of the transactions that were completed by the failed server 12 may be replayed by the selected substitute server 12.

As depicted in FIG. 1, in some embodiments of the invention, the journal 15 may be stored on one or more of the disk drives of the RAID array 14. However, in other embodiments in the invention, the journal 15 may be stored in another memory, such as a dynamic random access memory (DRAM), a flash random access memory (RAM), or another type of RAM or semiconductor memory, as just a few examples.

Figure 2:
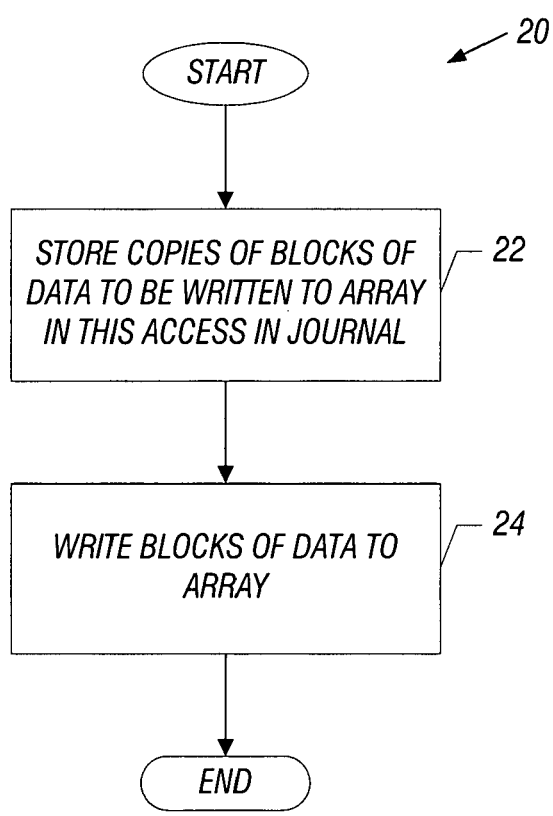
FIG. 2 is a flow diagram depicting a technique to write to a disk drive array of the computer system of FIG. 1 according to an embodiment of the invention.

Thus, in light of the foregoing discussion, in some embodiments of the invention, a particular server 12 that accesses the RAID array 14 may perform a technique 20 that is depicted in FIG. 2. In this technique 20, the server 12 stores (block 22) copies of blocks of data to be written to the array 14 in this particular access into the journal 15, thereby defining the open write transactions for the access. Next, the server 12 proceeds with the access by writing (block 24) the blocks of data (as posted in the journal 15) into the RAID array 14.

Figure 3:
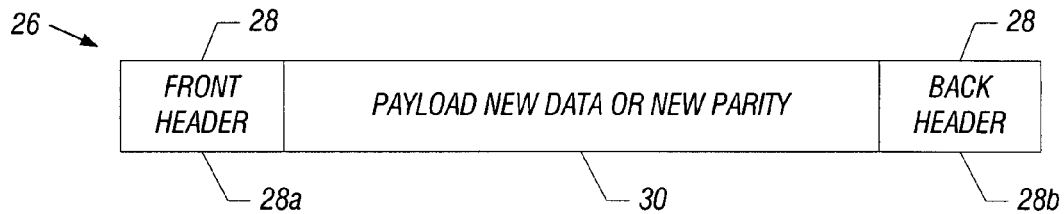
FIG. 3 is an illustration of a segment according to an embodiment of the invention.

In some embodiments of the invention, for storage of transaction information, as well as user data and parity data, an abstract object called a transaction container may be used. In this manner, a transaction container may be formed from transaction container segments 26, one of which is depicted in FIG. 3. Each segment 26 is associated with a particular write transaction and includes headers 28 that, among other things, are used to indicate whether payload data (i.e., the new parity or other data) of the segment 26 is valid. More particularly, a particular segment 26 may include a front header 28a and a back header 28b. The front 28a and back 28b headers enclose a payload section 30 that contains either the new user data to be written to the array 14 or the new parity data.

Figure 4:
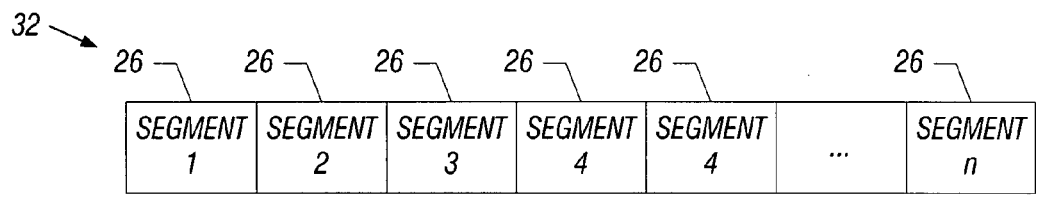
FIG. 4 is an illustration of a transaction container according to an embodiment of the invention.

An arbitrary number of transaction container segments 26 forms a transaction container 32, one of which is depicted, for example, in FIG. 4. In some embodiments of the invention, in a particular transaction container 32, all segments 26 are equal in size. Thus, the front 28a and back 28b headers for all segments 26 may always be placed at fixed offsets from the beginning of the transaction container 32. Such a design simplifies the management of the transaction container 32 and speeds up search operations for the headers 28 when a server fails and does not finish the transaction contained with the headers 28.

The front 28a and back 28b headers of each segment 26, in some embodiments of the invention, contain the same information if no corruption has occurred. In this manner, during recovery of open transactions, the selected substitute server compares front 28a and back 28b headers of a particular segment 26 to determine if their contents match exactly. If so, the substitute server further analyzes the headers 28 to determine if the segment 26 may be used to recover the transaction. Such a technique is useful, for example, to detect cases where the failure of the server 12 disrupts the recording of the open transactions themselves.

Depending on the segment size, the recording of new user data or new parity of a transaction might involve one or more segments 26. All headers of involved segments 26 must be equal, in some embodiments of the invention. Thus, the headers 28 must contain all information required for the recovery of open transactions.

For purposes of minimizing data transfer times during the recording of a particular open transaction, the server 12 creates a scatter-gather list for all headers 28 and all payload sections 30 of all segments 26 involved in a particular transaction is created, and the server 12 records the records the complete transaction record to the journal 15 in one action using the scatter-gather list.

Figure 5:
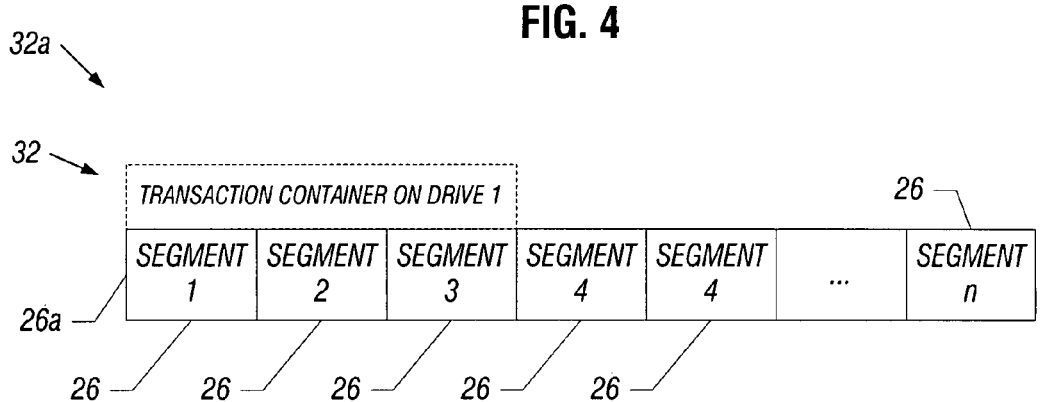
FIGS. 5, 6, 7, 8, 9 and 10 are illustrations of transaction containers according to examples of possible embodiments of the invention.
Figure 6:
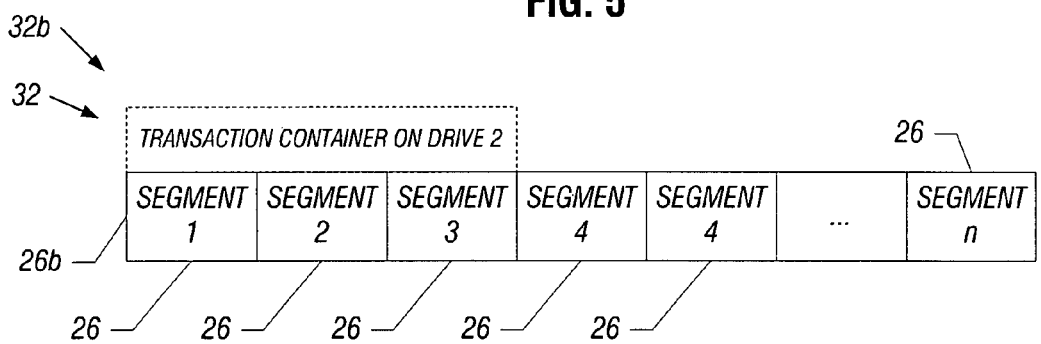
Figure 7:
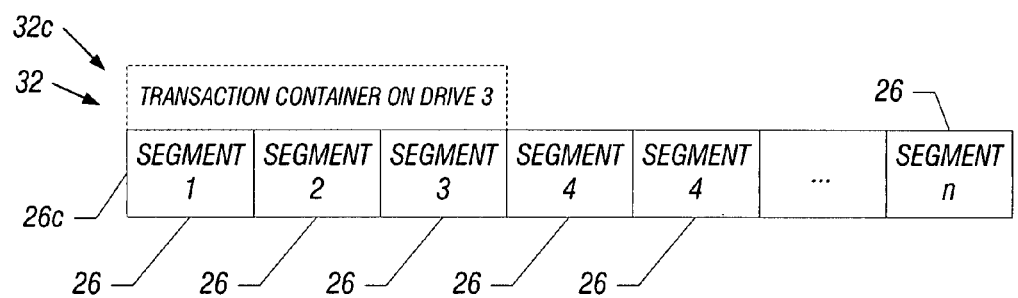

In some embodiments of the invention, the journal 15 may be stored on the disk drives of the RAID array 14. More particularly, in some embodiments of the invention, the journal 15 may be formed from several transaction containers 32, one of which is stored on each disk of the RAID array 14. As a more specific example, FIGS. 5, 6 and 7 depict specific containers 32a (FIG. 5), 32b (FIG. 6) and 32c (FIG. 7) that are located on separate disk drives of the RAID array 14. As an example, a particular partial or full stripe write operation to the RAID array 14 may involve, for example, block write operations to all three drives. Therefore, in a particular stripe write operation, the segments 26a (of the container 32a), 26b (of the container 32b) and 26c (of the container 32c) may be written by a particular server 12 to establish the open transactions for subsequent write operations to the corresponding drives of the RAID array 14.

Having one transaction container 32 per member disk drive of the array 14 provides the same failure protection for the transaction container 32 as for the array 14. Stated differently, when one of the drives of the RAID array 14 fails, then the transaction container 32 is still usable. For purposes of ensuring this, in some embodiments of the invention, the new user or new parity data is stored in the same transaction container 32 on the same disk drive (of the array 14) that the new user data and new parity will be written to. Alternatively stated, the user data and parity data write transaction records are striped across the array 14 in exactly the same way that the data and parity blocks are striped across the array 14. In contrast, if the transaction container is kept only on one disk drive of the array 14 and this disk drive fails, then the transaction records would be lost.

In some embodiments of the invention, the transaction container 32 is organized very similarly to a ring-buffer. In this manner, the storing of segments 26 always begins at segment one of the transaction container 32 after the access write was obtained by the servers 12, then the container 32 is filled up until the last segment 26 is used. At this point, a wrap-around is done and filling up of the transaction container 32 is continued starting at segment 26 one again. In this case it must be taken into account not to overwrite segments 26 that belong to transactions that are still open. This still may be achieved, for example, by explicitly tracking the state of the segments 26 (in some embodiments of the invention) or by implicitly adjusting the size of the transaction container 32 to ensure that the segments 26 do not overlap.

Figure 8:
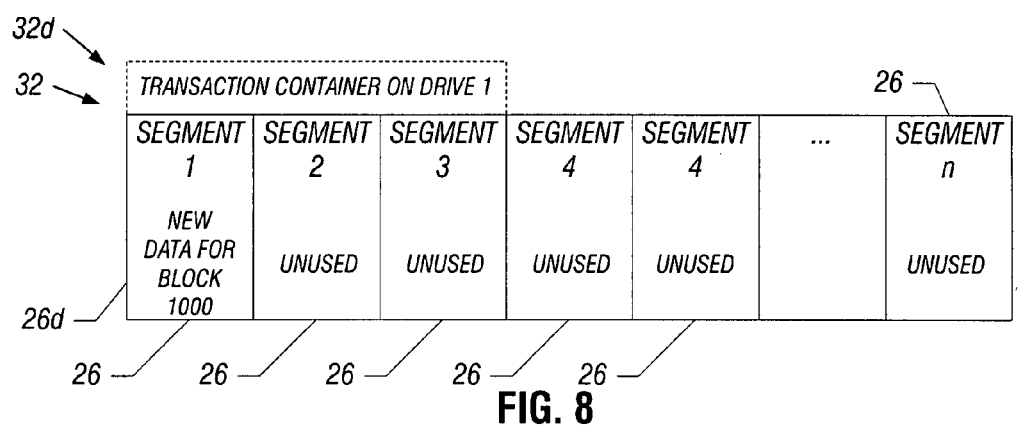
Figure 9:
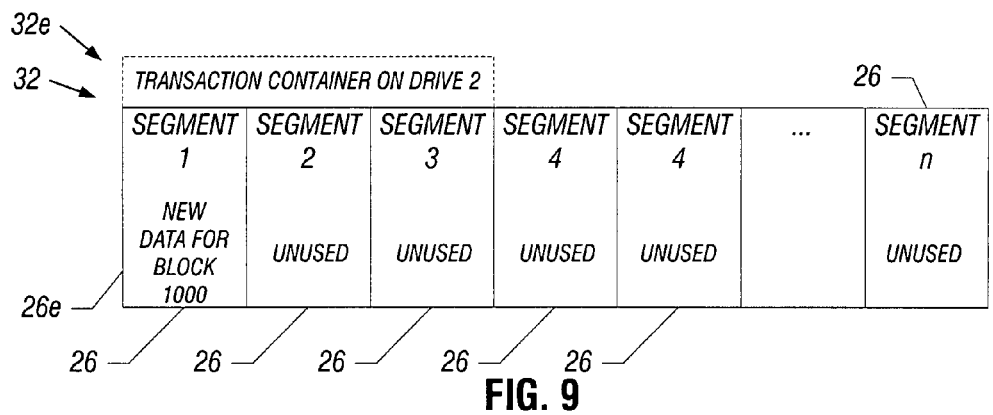
Figure 10:
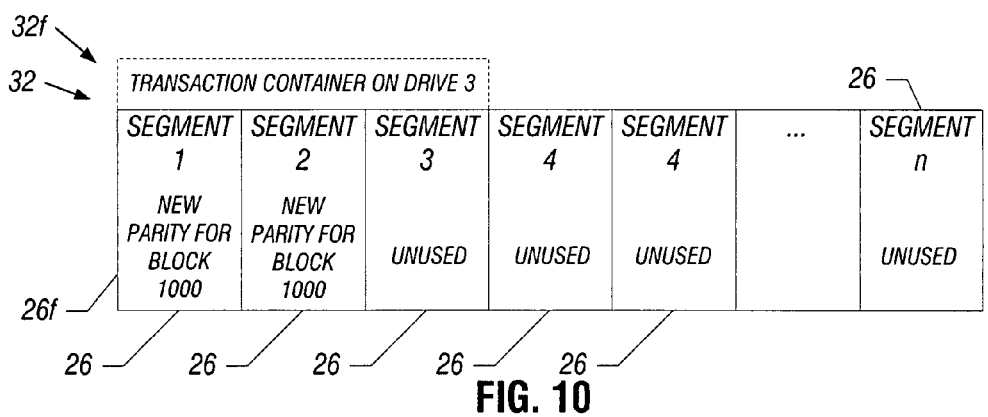

As a more specific example, FIGS. 8, 9 and 10 depict transaction containers 32d, 32e and 32f that are stored on different respective disk drives of the RAID array 14. In this example, two user data write operations occur: one to block number 1,000 on the disk drive on which the transaction container 32d is stored and another to block number 1,000 on the disk drive on which the transaction container 32e is stored. For this example, four resulting transactions are recorded. In this manner, new user data for the first transaction allocates segment number one of the transaction container 32*d*. The parity data is stored in segment number one of transaction container 32*f*. For this example, RAID4 is used, therefore, the disk drive on which the transaction container 32*f* is stored is a dedicated drive. For the remaining transactions, segment number one of the transaction containers 32*e* and segment number two of the transaction container 32*f* are used.

In some embodiments of the invention, the front 28*a* and back 28*b* headers include the following information: a header version number, to allow background compatibility; a time stamp, which may be a counter (a 32-bit counter, for example); I/O specific information, such as starting block number and block count of the new data and new parity I/O; a flag that identifies the type of the payload, either new user data or new parity; the number of segments 26 used by the recorded transaction; and a transaction counter that is used to sort the segments 26 ascending in time during transaction recovery. Whenever the access right is granted to a new server, then a time stamp counter is incremented by one. This allows identification of all segments 26 that were or should had been written during one single ownership of a particular access to the array 14.

When one of the servers 12 fails, the remaining servers 12 elect a substitute server 12 to perform the transactions that were recorded in the journal 15 by the failed server 12. For recovery of open transactions, the basic idea is to retrieve all valid segments 26 containing new data and new parity from the transaction containers 32 and write the new data and new parity to corresponding blocks on the disk drives of the array 14. In order to do this, the substitute server first reads and analyzes the segment 26 headers. The information in the headers is used to qualify the segments 26, and to check whether the segments 26 do contain valid transactions or not. For segments 26 to qualify for recovery of transactions, the time stamp must match the time stamp generated for the latest ownership of the array 14, the number of segments 26 found for a single transaction much match the number of segments 26 recorded in the headers, etc.

During recovery, before all qualified segments 26 are written to the corresponding disk drives using the I/O specific information in the headers 28, the starting point in the transaction container 32 is found. As the transaction container 32 is organized very similar to a ring-buffer, the starting point may not, and in almost any cases will not be, the first segment 26 of the transaction container 32. For purposes of finding the starting point, the substitute server 12 evaluates the transaction counter in the segment 26 headers. In this manner, the segment 26 with the lowest transaction counter is then elected as the starting point.

The substitute server 12 then proceeds with retrieving transactions, starting at the oldest ones and proceeding towards newer ones. This way, only the newest set of new user data and new parity data survives, even if some transactions overlap. Note, that this technique does not take care of, whether a transaction still was open at the time of the failure or not. All valid transactions found in the transaction container 32 are simply re-done.

As mentioned above the transaction container 32 can reside in any kind of storage. The specific details of the storage device type is kept hidden by an abstraction layer.

Figure 11:
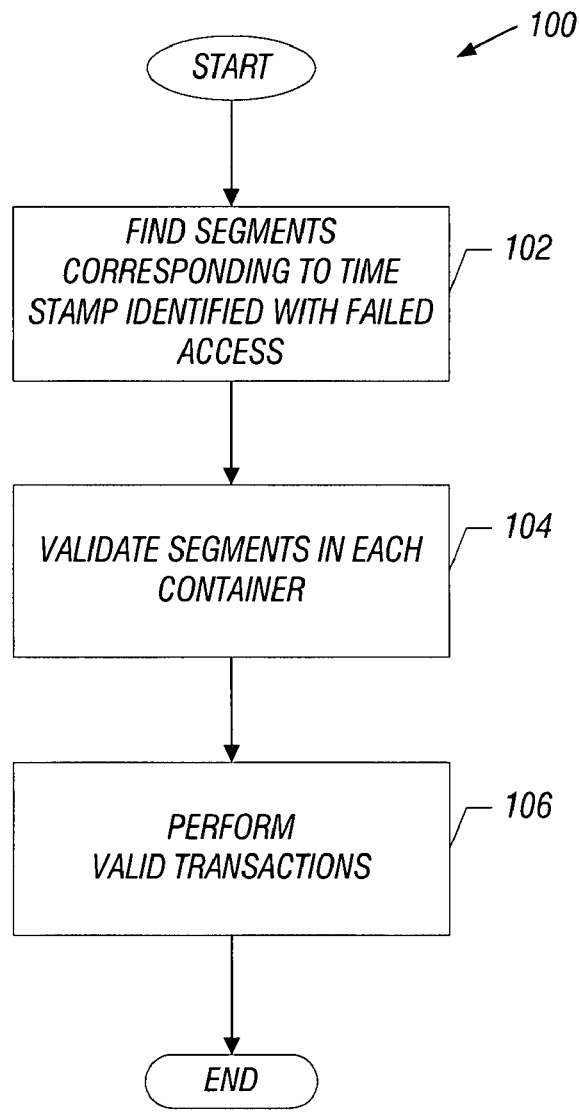
FIG. 11 is a flow diagram depicting a technique to reconstruct a server access according to an embodiment of the invention.

Thus, to briefly summarize, in some embodiments of the invention, the elected substitute server 12 may use a technique 100 that is depicted in FIG. 11. In this technique 100, the server 12 finds (block 102) segments 26 that correspond to the time-stamp that is identified with the failed access. The server 12, pursuant to the technique 100, then validates (block 104) the segments 26 in each container 32. With these valid data segments, the server 12 then performs (block 106) the valid stored transactions.

Thus, the advantages of the above-described arrangement may be one or more of the following. Having one transaction container 32 per member disk drive of the array 14 provides the same failure protection from the transaction container 32 as for the array 14. Or in other words, when the array 14 falls from a ready mode to a degraded mode, the transaction container 32 is still usable. This means, that it is possible to recover from double failures, where the server 12 owning the access right fails and simultaneously the array 14 falls from the ready to degraded modes.

A second advantage of keeping the transaction containers 32 on the member disk drives of the array 14 is the ability to recover from concurrent failure of all servers 12. In this manner, should this scenario occur, the array 14 can be migrated to a new server or cluster environment, and all open transactions can be finished, thereby ensuring consistency between data and parity. This is not possible, when the transaction container 32 is residing in the local memory of a single controller card, for example.

Figure 12:
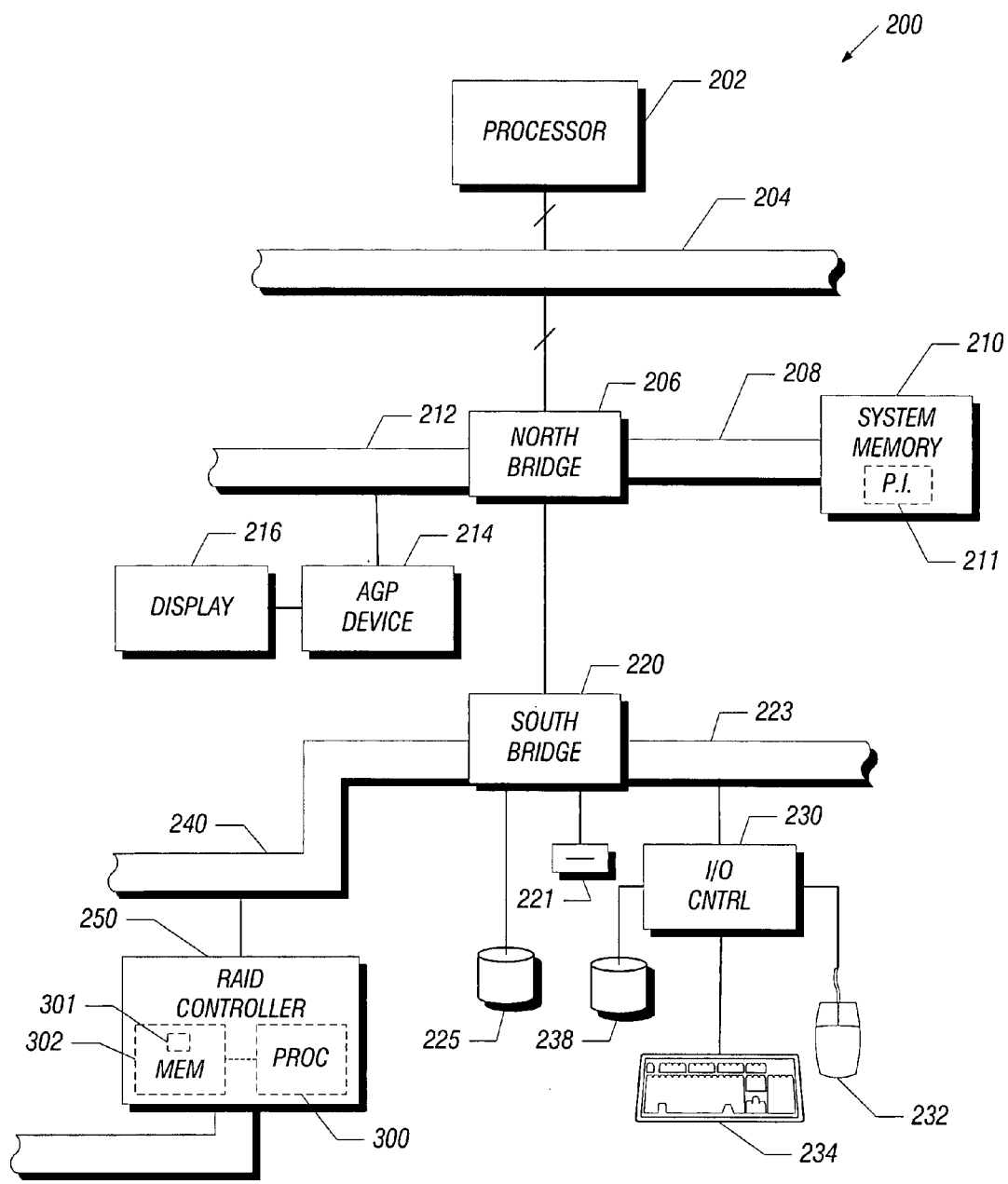
FIG. 12 is a schematic diagram of a server according to an embodiment of the invention.

In some embodiments of the invention, the server 12 may be a computer, such as an exemplary computer 200 that is depicted in FIG. 12. In this manner, referring to FIG. 12, this computer 200 may include a processor (one or more microprocessors, for example) 202 that is coupled to a local bus 204. Also coupled to the local bus 204 may be, for example, a memory hub, or north bridge 206. The north bridge 206 provides interfaces to the local bus 204, a memory bus 208, an Accelerated Graphics Port (AGP) bus 212 and a hub link. The AGP is described in detail in the Accelerated Graphics Port Interface Specification, Revision 1.0, published on Jul. 31, 1996, by Intel Corporation of Santa Clara, Calif. A system memory 210 may be accessed via the system bus 208, and an AGP device 214 may communicate over the AGP bus 212 and generate signals to drive a display 216. The system memory 210 may store various program instructions 211, such as instructions related to electing the substitute server and performing the transactions recorded by a failed server should the computer system 200 be elected the substitute server. In this manner, in some embodiments of the invention, the instructions cause the processor 202 to perform one or more of the techniques that are described above.

The north bridge 206 may communicate with a south bridge 210 over the hub link. In this manner, the south bridge 220 may provide an interface for an I/O expansion bus 223 and a Peripheral Component Interconnect (PCI) bus 240. The PCI Specification is available from The PCI Special Interest Group, Portland, Oreg. 97214. An I/O controller 230 may be coupled to the I/O expansion bus 223 and receive input from a mouse 232 and a keyboard 234, as well as control operations of a floppy disk drive 238. The south bridge 220 may, for example, control operations of a hard disk drive 225 and a CD-ROM drive 221. A RAID controller 250 may be coupled to the PCI bus 240 and establish communication between the RAID array 14 and the computer 200 via a bus 252, for example. The RAID controller 250, in some embodiments of the invention, may be in the form of a PCI circuit card that is inserted into a PCI slot of the computer 200, for example.

In some embodiments of the invention, the RAID controller 250 includes a processor 300 and a memory 302 that stores such as instructions 301 related to electing the substitute server and performing the transactions recorded by a failed server should the computer system 200 be elected the substitute server. In this manner, in some embodiments of the invention, the instructions cause the processor 300 to perform one or more of the techniques that are described above. Thus, in these embodiments, the processor 300 of the RAID controller 250 performs the RAID-related functions, instead of the processor 202. In other embodiments of the invention, both the processor 202 and the processor 300 may perform different RAID-related functions. Other variations are possible.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
writing blocks of data from a plurality of servers to an array of disks shared in common by the servers; and
prior to the writing of each block of data to the array of disks, storing in a journal a copy of said each block of data to be written to the array of disks and storing headers in the journal, wherein the act of storing the headers comprises storing a first header before the storing of the copy and storing a second header identical to the first header after the storing of the copy such that the first and second headers indicate that the copy was successfully stored if the first and second headers are the same.

2. The method of claim 1, wherein the journal comprises transaction containers, each transaction container being associated with one of the disks of the array and comprising segments, and each segment comprising a copy of a block of data written to an associated disk.

3. The method of claim 2, wherein each transaction container is stored on the associated disk.

4. The method of claim 2, wherein each segment further comprises said at least one header.

5. The method of claim 1, wherein the journal comprises only copies of most recent blocks of data written to the array.

6. The method of claim 1, wherein each block of data is written by one of the servers.

7. The method claim 6, wherein each said copy of the block of data is written to the journal by the same one of the servers that writes the block of data to the array of disks.

8. The method of claim 1, wherein the journal is stored in a magnetic media.

9. The method of claim 1, wherein the journal is stored in a semiconductor memory.

10. A system comprising:
a processor; and
a memory storing a program to cause the processor to:
write blocks of data to an array of disks shared in common by at least the computer system and at least one server,
prior to the writing of each block of data to the array of disks, store in a journal a copy of a block of data to be written to the array of disks and store headers in the journal to indicate that, the copy was successfully stored in the journal, wherein the storage of the headers comprises storage of a first header before the storage of the copy and storage of a second header identical to the first header after the storage of the copy such that the first and second headers indicate that the copy was successfully stored if the first and second headers are the same.

11. The system of claim 10, wherein the journal comprises:
transaction containers, each transaction container being associated with one of the disks of the array and comprising segments, and each segment comprising a copy of a block of data written to an associated disk.

12. The system of claim 11, wherein each transaction container is stored on the associated disks.

13. The system of claim 11, wherein each segment further comprises said at least one header.

14. The system of claim 10, wherein the journal comprises only copies of the most recent blocks of data written to the array of disks.

15. An article comprising a computer readable storage medium storing instructions to cause a processor to:
write blocks of data to an array of disks shared in common by at least the computer system and a server, and
prior to the writing of each block of data to the array of disks, store in journal a copy of the block of data to be written to the array of disks and store headers in the journal to indicate that the copy was successfully stored in the journal, wherein the storage of the headers comprises storage of a first header before the storage of the copy and storage of a second header identical to the first header after the storage of the copy such that the first and second headers indicate that the copy was successfully stored if the first and second headers are the same.

16. The article of claim 15, wherein the journal comprises transaction containers, each transaction container being associated with one of the disks of the array and comprising segments, and each segment comprising a copy of a block of data written to the associated disk.

17. The article of claim 15, wherein each transaction container is stored on the associated disk.

* * * * *